(12) United States Patent
Yabbo et al.

(10) Patent No.: US 12,480,889 B2
(45) Date of Patent: Nov. 25, 2025

(54) INSPECTION RECIPE OPTIMIZATION FOR SEMICONDUCTOR SPECIMENS

(71) Applicant: Applied Materials Israel Ltd., Rehovot (IL)

(72) Inventors: Paz Yabbo, Gedera (IL); Boaz Dudovich, Rehovot (IL); Bhavna Ghai, Rehovot (IL); Amir Bar, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 527 days.

(21) Appl. No.: 17/845,953

(22) Filed: Jun. 21, 2022

(65) Prior Publication Data

US 2023/0408423 A1    Dec. 21, 2023

(51) Int. Cl.
*G01N 21/95* (2006.01)
*G06N 3/08* (2023.01)
*G06T 7/00* (2017.01)

(52) U.S. Cl.
CPC ......... *G01N 21/9501* (2013.01); *G06N 3/08* (2013.01); *G06T 7/0004* (2013.01); *G06T 2207/20081* (2013.01); *G06T 2207/30148* (2013.01)

(58) Field of Classification Search
CPC . G06T 2207/20081; G06T 2207/30148; G06T 2207/10061; G06T 7/0004; G06T 2207/20224; G06T 7/001; G06T 2207/20084; G06V 10/82; G06V 2201/06; G06V 10/25; G06V 10/758; G06F 18/24; G06N 20/00; G06N 3/08; G01N 21/9501; G01N 21/8851; G01N 2021/8854; G01N 2021/8883; G01N 2021/8887; H01L 22/20; H01L 22/12; H01L 22/14
See application file for complete search history.

(56) References Cited

U.S. PATENT DOCUMENTS

| | | | |
|---|---|---|---|
| 10,181,185 B2 | 1/2019 | Park | |
| 10,657,214 B2 | 5/2020 | Banna | |
| 10,930,597 B2 | 2/2021 | Lim | |
| 11,921,052 B2 | 3/2024 | Danen | |
| 2018/0293722 A1* | 10/2018 | Crocco | G06V 10/82 |
| 2019/0067060 A1* | 2/2019 | Plihal | G06T 7/001 |
| 2019/0213733 A1* | 7/2019 | Yati | G06T 7/0006 |
| 2019/0257767 A1* | 8/2019 | Shaubi | G06T 7/0004 |
| 2020/0234428 A1* | 7/2020 | George | G06N 3/082 |
| 2020/0294224 A1* | 9/2020 | Shaubi | G06V 20/69 |

* cited by examiner

*Primary Examiner* — Sumati Lefkowitz
*Assistant Examiner* — Aaron Joseph Sorrin
(74) *Attorney, Agent, or Firm* — Lowenstein Sandler LLP

(57) ABSTRACT

There is provided a system and method of optimizing an inspection recipe for inspecting a semiconductor specimen. The method includes obtaining test data from a test performed after inspection, the test data indicative of functional defectivity of the specimen with respect to at least one structural feature at a suspected layer; retrieving inspection data of the suspected layer including a set of inspection images and a set of defect maps of the plurality of processing steps of the suspected layer; correlating the test data and the set of defect maps of the suspected layer to identify one or more structural features of the suspected layer with unmatched defectivity; for each of the identified structural features, including at least part of the inspection images corresponding to the structural feature in a training set; and using the training set to train a machine learning (ML) model in the inspection recipe.

20 Claims, 5 Drawing Sheets

INSPECTION RECIPE OPTIMIZATION FOR SEMICONDUCTOR SPECIMENS

TECHNICAL FIELD

The presently disclosed subject matter relates, in general, to the field of examination of a semiconductor specimen, and more specifically, to defect inspection and detection on the specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination can generally employ a two-phase procedure, e.g., inspection of a specimen followed by review of sampled locations of potential defects. Examination generally involves generating certain output (e.g., images, signals, etc.) for a specimen by directing light or electrons to the wafer, and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having high probability of being a defect. During the second phase, at least some of the suspected locations are more thoroughly analyzed with relatively high resolution, for determining different parameters of the defects, such as classes, thickness, roughness, size, and so on.

Examination can be provided by using non-destructive examination tools during or after manufacture of the specimen to be examined. A variety of non-destructive examination tools includes, by way of non-limiting example, scanning electron microscopes, atomic force microscopes, optical inspection tools, etc. In some cases both the two phases can be implemented by the same inspection tool, and, in some other cases, these two phases are implemented by different inspection tools.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

By way of example, examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc. Automated examination systems ensure that the parts manufactured meet the quality standards expected and provide useful information on adjustments that may be needed to the manufacturing tools, equipment, and/or compositions, depending on the type of defects identified.

In some cases, machine learning technologies can be used to assist the automated examination process so as to promote higher yield. For instance, supervised machine learning can be used to enable accurate and efficient solutions for automating specific examination applications based on sufficiently annotated training images.

SUMMARY

In accordance with certain aspects of the presently disclosed subject matter, there is provided a computerized system of optimizing an inspection recipe for inspecting a semiconductor specimen, the system comprising a first processing and memory circuitry (PMC) configured to: obtain test data from a test performed on the semiconductor specimen after inspection thereof, the semiconductor specimen comprising one or more layers, each layer comprising structural features manufactured by a plurality of processing steps, the test data indicative of functional defectivity of the semiconductor specimen with respect to at least one structural feature at a suspected layer of the one or more layers; retrieve inspection data of the suspected layer acquired during the inspection of the semiconductor specimen, the inspection data including a set of inspection images corresponding to at least a sampled set of the plurality of processing steps of the structural features of the suspected layer, and a set of defect maps corresponding to the set of inspection images and indicative of inspection defectivity with respect to the sampled set of processing steps of the structural features; correlate the test data and the set of defect maps of the suspected layer to identify one or more structural features of the suspected layer with unmatched defectivity between the functional defectivity indicated by the test data and the inspection defectivity indicated by the set of defect maps; for each structural feature of the identified one or more structural features, include at least part of the set of inspection images corresponding to the structural feature in a training set; and use the training set to train a machine learning (ML) model in the inspection recipe usable for inspection of a subsequent semiconductor specimen.

In addition to the above features, the system according to this aspect of the presently disclosed subject matter can comprise one or more of features (i) to (ix) listed below, in any desired combination or permutation which is technically possible:

(i). The test is one of: an electrical test, a destructive test, and a reliability test.

(ii). The inspection is in-line inspection performed during a fabrication process of the semiconductor specimen, and the test is an end-of-line (EOL) test performed upon completion of the fabrication process or part thereof (e.g., upon completion of specific processing steps of the fabrication process).

(iii). The structural features in a layer of the one or more layers are of a type of: a contact, a via, a gate, a shallow trench isolation (STI), and a metal wire.

(iv). The plurality of processing steps includes one or more of the following: lithography, etching, filling, depositing, polishing, recessing, planarization, growth, and implantation, and the sampled set includes a subset of the plurality of processing steps that are selected to be inspected during the inspection.

(v). The correlation is performed by aligning the test data with the set of defect maps and comparing the functional defectivity and the inspection defectivity for corresponding locations.

(vi). The one or more structural features with unmatched defectivity include a first structural feature indicated as defective by the test data but not defective by the set of defect maps. The PMC is further configured to analyze the set of inspection images of the suspected layer at a location of the first structural feature to identify one or more processing steps in the at least sampled set with high probability of causing defectivity of the first structural feature. The including comprises including, in the training set, at least part of one or more inspection images of the one or more processing steps corresponding to the first structural feature with an associated label of defect of interest (DOI).

(vii). The including further comprises including design data of the one or more processing steps corresponding to the first structural feature, in addition to the at least part of the one or more inspection images, in the training set.

(viii). The one or more structural features with unmatched defectivity includes a second structural feature indicated as defective by at least one defect map in the set of defect maps but not defective by the test data. The including comprises including, in the training set, at least part of at least one inspection image corresponding to the at least one defect map with an associated label of nuisance, the at least part corresponding to the second structure feature.

(ix). The ML model, upon being trained, is capable of improving capture rate of defects of interest (DOIs) which were previously missed by the inspection recipe, and reducing false alarm rate of nuisances which, were previously incorrectly detected by the inspection recipe as DOIs.

In accordance with other aspects of the presently disclosed subject matter, there is provided a computerized method of optimizing an inspection recipe for inspecting a semiconductor specimen, the method comprising: obtaining test data from a test performed on the semiconductor specimen after inspection thereof, the semiconductor specimen comprising one or more layers, each layer comprising structural features manufactured by a plurality of processing steps, the test data indicative of functional defectivity of the semiconductor specimen with respect to at least one structural feature at a suspected layer of the one or more layers; retrieving inspection data of the suspected layer acquired during the inspection of the semiconductor specimen, the inspection data including a set of inspection images corresponding to at least a sampled set of the plurality of processing steps of the structural features of the suspected layer, and a set of defect maps corresponding to the set of inspection images and indicative of inspection defectivity with respect to the sampled set of processing steps of the structural features; correlating the test data and the set of defect maps of the suspected layer to identify one or more structural features of the suspected layer with unmatched defectivity between the functional defectivity indicated by the test data and the inspection defectivity indicated by the set of defect maps; for each structural feature of the identified one or more structural features, including at least part of the set of inspection images corresponding to the structural feature in a training set; and using the training set to train a machine learning (ML) model in the inspection recipe usable for inspection of a subsequent semiconductor specimen.

This aspect of the disclosed subject matter can comprise one or more of features (i) to (ix) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of optimizing an inspection recipe for inspecting a semiconductor specimen, the method comprising: obtaining test data from a test performed on the semiconductor specimen after inspection thereof, the semiconductor specimen comprising one or more layers, each layer comprising structural features manufactured by a plurality of processing steps, the test data indicative of functional defectivity of the semiconductor specimen with respect to at least one structural feature at a suspected layer of the one or more layers; retrieving inspection data of the suspected layer acquired during the inspection of the semiconductor specimen, the inspection data including a set of inspection images corresponding to at least a sampled set of the plurality of processing steps of the structural features of the suspected layer, and a set of defect maps corresponding to the set of inspection images and indicative of inspection defectivity with respect to the sampled set of processing steps of the structural features; correlating the test data and the set of defect maps of the suspected layer to identify one or more structural features of the suspected layer with unmatched defectivity between the functional defectivity indicated by the test data and the inspection defectivity indicated by the set of defect maps; for each structural feature of the identified one or more structural features, including at least part of the set of inspection images corresponding to the structural feature in a training set; and using the training set to train a machine learning (ML) model in the inspection recipe usable for inspection of a subsequent semiconductor specimen.

This aspect of the disclosed subject matter can comprise one or more of features (i) to (ix) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
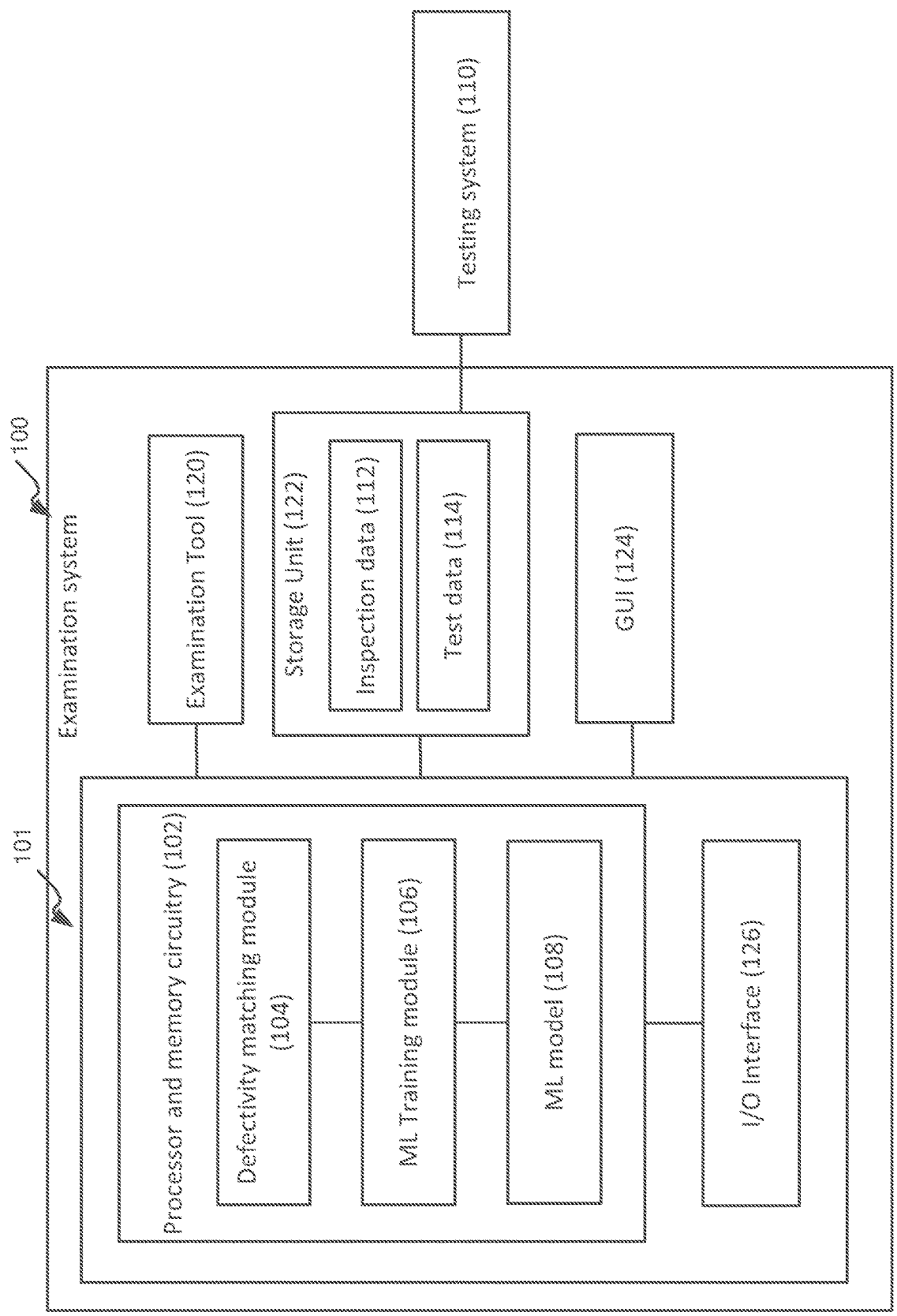
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "optimizing", "retrieving", "correlating", "identifying", "including", "using", "aligning", "comparing", "analyzing", "training", "improving", "reducing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the defect detection/recipe optimization system, the testing system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "defect candidate" used in this specification should be expansively construed to cover a suspected defect location on the specimen which is detected to have relatively high probability of being a defect of interest (DOI). Therefore, a defect candidate, upon being reviewed/tested, may actually be a DOI, or, in some other cases, it may be a nuisance as described above, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification of various types, segmentation, and/or metrology operations, such as, e.g., critical dimension (CD) measurements, with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning (in a single or in multiple scans), imaging, sampling, reviewing, measuring, classifying and/or other processes provided with regard to the specimen or parts thereof.

The one or more examination tools 120 can include one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). The inspection tool and review tool can be different tools located at the same or at different locations, or a single tool operated in two different modes. In some cases, at least one examination tool can have metrology capabilities and can be configured to perform metrology operations on the images.

Without limiting the scope of the disclosure in any way, it should also be noted that the examination tools 120 can be implemented as inspection machines of various types, such as optical inspection machines, electron beam inspection machines (e.g., Scanning Electron Microscope (SEM), Atomic Force Microscopy (AFM), or Transmission Electron Microscope (TEM), etc.), and so on. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools.

According to certain embodiments of the presently disclosed subject matter, one of the examination tools 120 is an inspection tool that scans a specimen (e.g., a wafer) to capture inspection images thereof. During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time. By way of example, the inspection tool can be an optical inspection tool. At each step, light can be detected from a rectangular portion of the wafer and such detected light is converted into multiple intensity values at multiple points in the portion, thereby forming an image corresponding to the part/portion of the wafer. For instance, in optical inspection, an array of parallel laser beams can scan the surface of a wafer along the swaths. The swaths are laid down in parallel rows/columns contiguous to one another to build up, swath-at-a-time, an image of the surface of the wafer. For instance, the tool can scan a wafer along a swath from up to down, then switch to the next swath and scan it from down to up, and so on and so forth, until the entire wafer is scanned and inspection images of the wafer are collected.

As described above, a semiconductor device (such as an integrated circuit (IC)) is often made of multiple layers, each comprising one or more structural modules/features of which the manufacturing process can include various processing steps such as, e.g., lithography, etching, filling, depositing, polishing, recessing, planarization, growth (such as epitaxial growth), and implantation, etc. The examination process (such as inspection) can be performed a multiplicity of times, for example following certain processing steps of structural features of a given layer, and/or following the manufacturing of certain layers, or the like. The inspection images acquired can therefore include images pertaining to certain processing steps of one or more layers of the specimen.

It is to be noted that, the term "inspection images" used herein can refer to original images of the specimen captured by the inspection tool during the manufacturing process, and/or derivatives of the captured images obtained by various pre-processing stages. It is to be noted that in some cases the images referred to herein can include image data (e.g., captured images, processed images, etc.) and associated numeric data (e.g., metadata, hand-crafted attributes, etc.).

According to certain embodiments of the presently disclosed subject matter, the examination system 100 comprises a computer-based system 101 operatively connected to the examination tools 120 and capable of enabling automatic defect detection of a semiconductor specimen in runtime, based on inspection images obtained during specimen fabrication. The examination system 100 can be an in-line inspection system that provides inspection within the production line of a specimen in the fabrication plant, e.g., between processing steps and/or between layers. As described above, the process of semiconductor manufacturing often requires multiple sequential processing steps, each one of which could possibly cause errors/defects that may lead to yield loss. Consequently, maintaining product quality in a semiconductor manufacturing facility often requires strict process control in the manufacturing process.

In some embodiments, along the manufacturing process, the inspection tool (e.g., the examination tool 120) can be configured to inspect, for each layer of the specimen, one or more processing steps thereof and acquire inspection images for the processing steps. The system 101 can be used to detect defects based on the inspection images of the processing steps using an inspection recipe, giving rise to defect maps indicative of defect candidate distribution on the inspection images. The inspection data 112 including the inspection images and the defect maps can be recorded in a storage unit (such as storage unit 122 as illustrated in FIG. 1).

During inspection, as the wafer is normally scanned at a relatively high-speed, the inspection images acquired typically have a relatively low resolution with various noises. The majority of the defect candidates detected therefrom are actually false alarms/nuisances (e.g., upon being reviewed), while some real defects may be missed from the detection output. The challenge of inspection is often how to improve detection sensitivity, i.e., suppressing false alarm rate while increasing capture rate of defects of interest (DOI).

At the end of the production line (EOL) (or at the end of a specific processing step or several processing steps), device performance is tested through various tests such as, e.g., electrical tests, destructive tests, reliability tests, etc. EOL can refer to one of the following: front-end-of-line (FEOL, where the individual devices such as transistors, capacitors, resistors, etc. are patterned on the wafer), middle-end-of-line (MEOL), or back-end-of-line (BEOL, where the individual devices get interconnected with wiring on the wafer, i.e., the metalization layer). Taking an electrical test as an example, electrical test data, such as threshold voltage, leakage current etc., can be obtained from the test to evaluate the functioning of certain aspects of the dies, and is highly correlated to feature-level dimensions on the dies. Semiconductor devices that fail one or more electrical tests may be isolated from other passing devices. For example, failed dies may be removed from the supply chain (e.g., discarded) or flagged for further testing/fixing, depending on the type and/or level of failure/defectivity.

However, such test data is only available after the fabrication of the semiconductor device, or after certain processing steps are completed in the fabrication process, depending on at which stage of device manufacturing the electrical test is being performed, e.g., whether the electrical test is a MEOL test, or BEOL test. While such tests may provide clues to the source of malfunction (e.g., at feature level), they typically have a relatively long feedback delay time as compared to in-line inspection. For instance, the timeframe for obtaining electrical test data can range from a few weeks to a couple of months, from front to back. In addition, the test data often does not give the semiconductor fabrication process enough actionable information about root cause, therefore does not effectively contribute to direct improvement of subsequent in-line inspection.

Accordingly, certain embodiments of the presently disclosed subject matter propose to correlate such test data with in-line inspection data for the purpose of effectively optimizing an inspection recipe and improving defect detection performance, as will be detailed below.

The examination system 100 comprises a computer-based system 101 capable of defect detection on a semiconductor specimen in runtime based on runtime images obtained by the examination tool 120 during specimen fabrication. Specifically, system 101 includes a processor and memory circuitry (PMC) 102 operatively connected to a hardware-based I/O interface 126. The PMC 102 is configured to provide processing necessary for operating the system as further detailed with reference to FIGS. 2-4 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

Functional modules comprised in the PMC 102 of system 101 can include a defectivity matching module 104, a machine learning (ML) training module 106 and a ML model 108. In some embodiments, the ML model 108 can be regarded as being comprised in a defect detection module as part of an inspection recipe usable for detecting defects on inspection images. System 101 can be regarded as an in-line inspection/defect detection system capable of optimizing the inspection recipe usable for in-line inspection and defect detection of a semiconductor specimen. Therefore, system 101 is also referred to as a recipe optimization system.

Specifically, according to certain embodiments, the PMC 102 can be configured to obtain, via an I/O interface 126, test data from a test (such as, e.g., an electrical test) performed on a semiconductor specimen (e.g., a die of a wafer) after inspection thereof. The semiconductor specimen comprises one or more layers, each layer comprising structural features manufactured by a plurality of processing steps. The test data is indicative of functional defectivity of the semiconductor specimen with respect to at least one structural feature at a suspected layer of the one or more layers.

The test can be performed by a testing system 110 to obtain the test data. In some embodiments, the testing system 110 can be configured to perform a test on the semiconductor specimen at the end of production line (i.e., EOL test), e.g., after the fabrication of the semiconductor device. In some embodiments, the testing system 110 can be configured to perform a test after certain processing steps are completed during the fabrication process.

In addition, the PMC 102 can be configured to retrieve, via an I/O interface 126, inspection data of the suspected layer acquired during the inspection of the semiconductor specimen. The inspection data includes a set of inspection images corresponding to at least a sampled set of the plurality of processing steps of the structural features of the suspected layer, and a set of defect maps corresponding to the set of inspection images and indicative of inspection defectivity with respect to the sampled set of processing steps of the structural features.

The defectivity matching module 104 can be configured to correlate the test data and the set of defect maps of the suspected layer to identify one or more structural features of the suspected layer with unmatched defectivity between the functional defectivity indicated by the test data and the inspection defectivity indicated by the set of defect maps.

The ML training module 106 can be configured to, for each structural feature of the identified one or more structural features, include at least part of the set of inspection images corresponding to the structural feature in a training set, and use the training set to train a machine learning model in the inspection recipe usable for inspection of a subsequent semiconductor specimen.

Operation of systems 100 and 101, the PMC 102, and the functional modules therein will be further detailed with reference to FIGS. 2-4.

In some cases, additionally to system 101, the examination system 100 can comprise one or more examination modules, such as, e.g., additional defect detection module and/or Automatic Defect Review Module (ADR) and/or Automatic Defect Classification Module (ADC) and/or a metrology-related module and/or other examination modules which are usable for examination of a semiconductor specimen. The one or more examination modules can be implemented as stand-alone computers, or their functionalities (or at least part thereof) can be integrated with the examination tool 120. In some cases, the output of system 101 can be provided to the one or more examination modules (such as the ADR, ADC, etc.) for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store inspection images of the specimen and/or derivatives thereof produced by the examination tool 120, such as, e.g., the inspection data 112 as described above. In addition, the storage unit 122 can be configured to store test data 114 obtained from the testing system 110, as described above. Accordingly, the inspection data 112 and test data 114 can be retrieved from the storage unit 122 and provided to the PMC 102 for further processing. The output of the system 101, such as the trained ML model, and/or defect detection output, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the inspection images of the specimen, the corresponding defect maps, and/or the test data, etc. The user may be provided, through the GUI, with options of defining certain operation parameters. The user may also view the operation results or intermediate processing results, such as, e.g., the matching of defectivity between the defect maps and the test data, the defect detection output, etc., on the GUI. In some cases, system 101 can be further configured to send certain output to the storage unit 122, and/or external systems (e.g., Yield Management System (YMS) of a fabrication plant (FAB)).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned components and functional modules shown in FIG. 1 can be distributed over several local and/or remote devices, and can be linked through a communication network. For instance, the examination system 100 and the testing system 110 can be located at the same entity or distributed over different entities. The examination tool 120 and the system 101 can be located at the same entity (in some cases hosted by the same device) or distributed over different entities.

It is further noted that in other embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

Figure 2:
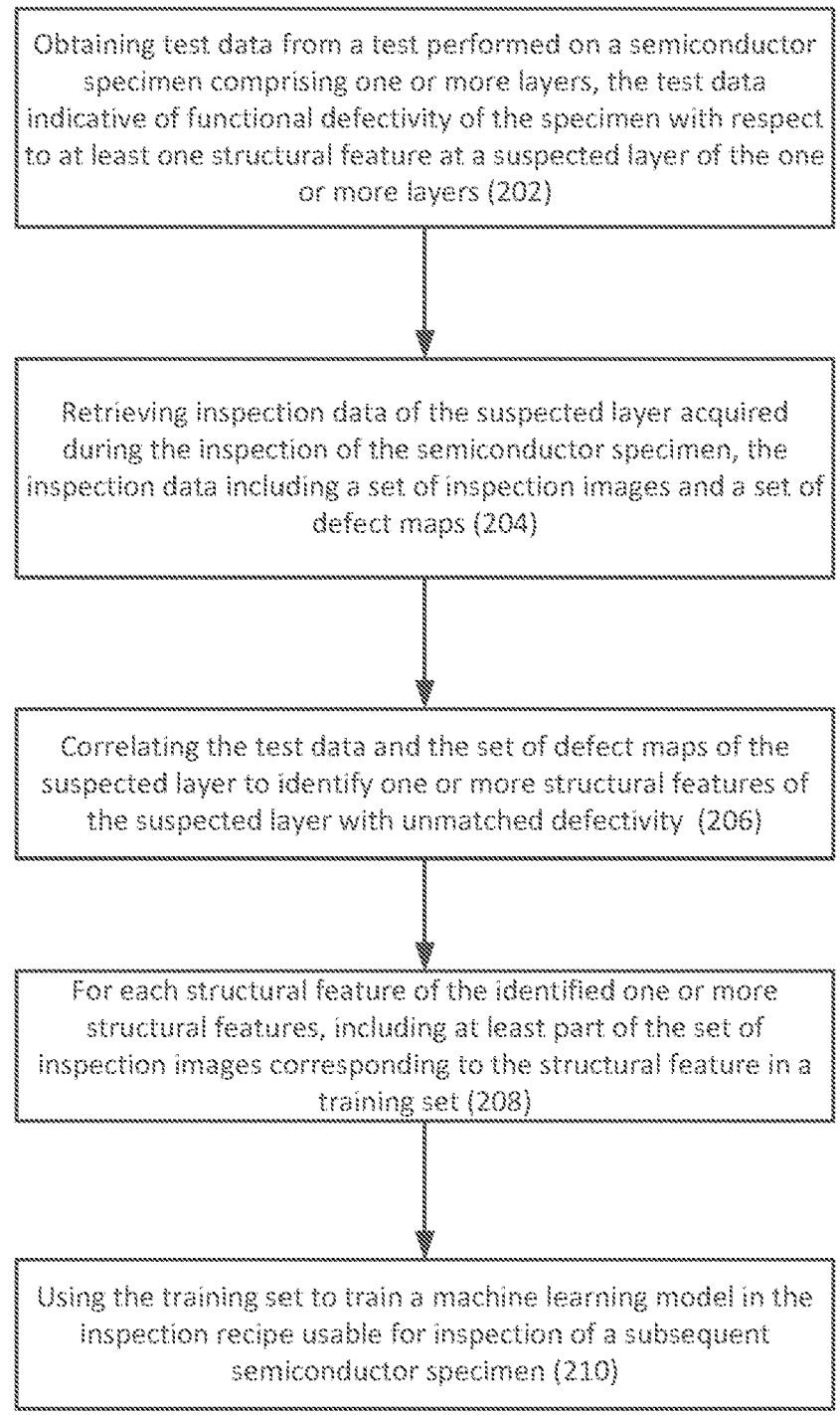
FIG. 2 illustrates a generalized flowchart of optimizing an inspection recipe for inspecting a semiconductor specimen in accordance with certain embodiments of the presently disclosed subject matter.
Figure 3:
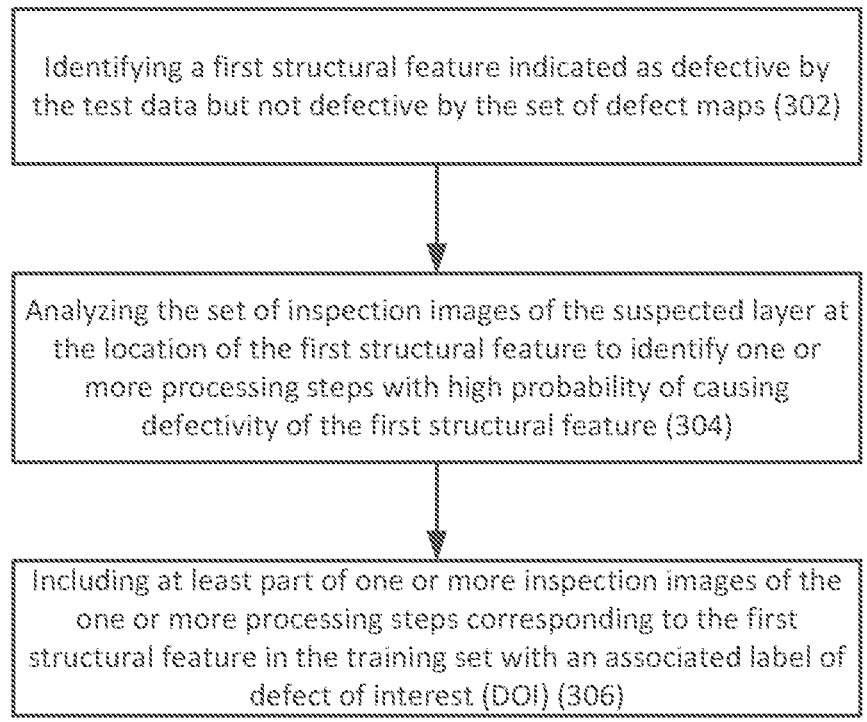
FIGS. 3 and 4 illustrate examples of two types of unmatched defectivity in accordance with certain embodiments of the presently disclosed subject matter.
Figure 4:
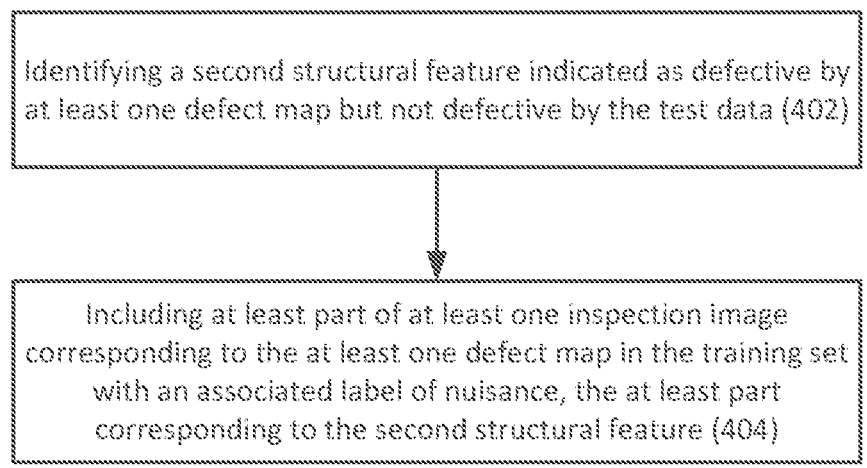

While not necessarily so, the process of operation of systems 101 and 100 can correspond to some or all of the stages of the methods described with respect to FIGS. 2-4. Likewise, the methods described with respect to FIGS. 2-4 and their possible implementations can be implemented by systems 101 and 100. It is therefore noted that embodiments discussed in relation to the methods described with respect to FIGS. 2-4 can also be implemented, mutatis mutandis as various embodiments of the systems 101 and 100, and vice versa.

Referring to FIG. 2, there is illustrated a generalized flowchart of optimizing an inspection recipe for inspecting a semiconductor specimen in accordance with certain embodiments of the presently disclosed subject matter.

As described above, a semiconductor device/specimen is manufactured in a fabrication process (also termed herein as manufacturing process) where a sequence of multiple processing steps are carried out during which electronic circuits are gradually created on a wafer. Specifically, a specimen typically comprises multiple layers, each comprising structural features manufactured by a plurality of processing steps. A structural feature can refer to an element or module to be manufactured on a layer that has a specific designed structure and functionality. By way of example, a structural feature can be of a type of the following: a contact, a via, a gate, a shallow trench isolation (STI), and a metal wire, etc. The plurality of processing steps for manufacturing a structural feature in a layer can include one or more of the following: lithography, etching, filling, depositing, polishing, recessing, planarization, growth, and implantation, etc. Taking a contact in a storage node as an example, it generally takes about four processing steps to manufacture it: lithography, etching, depositing, and polishing.

During the fabrication process of the structural features in a given layer, the specimen can be inspected by an inspection tool following each processing step (or following each sampled/selected processing step), and an inspection image can be acquired by the inspection tool. A defect map corresponding to the inspection image can be generated using an inspection recipe, the defect map indicative of inspection defectivity distribution on the inspection image of the corresponding processing step. This is also referred to as in-line inspection which is performed within the production line of a specimen during the fabrication process, e.g., between processing steps and/or between layers.

Additionally, various tests can be performed on the semiconductor specimen to evaluate device functionality and performance, e.g., after certain layers or processing steps are completed during the fabrication process, or at the end of the production line (EOL), after the fabrication process is completed. By way of example, a test can be one of the following: an electrical test, a destructive test (e.g., cross-section examination by, e.g., Transmission Electron Microscopy (TEM) or SEM), a reliability test (e.g., for identifying devices that currently function well, but may fail at a later time (e.g., devices having latent defects)), or any suitable combination thereof.

Test data can be obtained (202) (e.g., by the defectivity matching module 104 in the first PMC 102 via the I/O interface 126) from a test performed on the specimen. As described, the semiconductor specimen comprises one or more layers, each layer comprising structural features manufactured by a plurality of processing steps. The test data is indicative of functional defectivity of the semiconductor specimen with respect to at least one structural feature at a suspected layer of the one or more layers of the specimen. By way of example, the semiconductor specimen can refer to a die which is a block of a semiconductor wafer on which a given functional circuit is fabricated.

Figure 5:
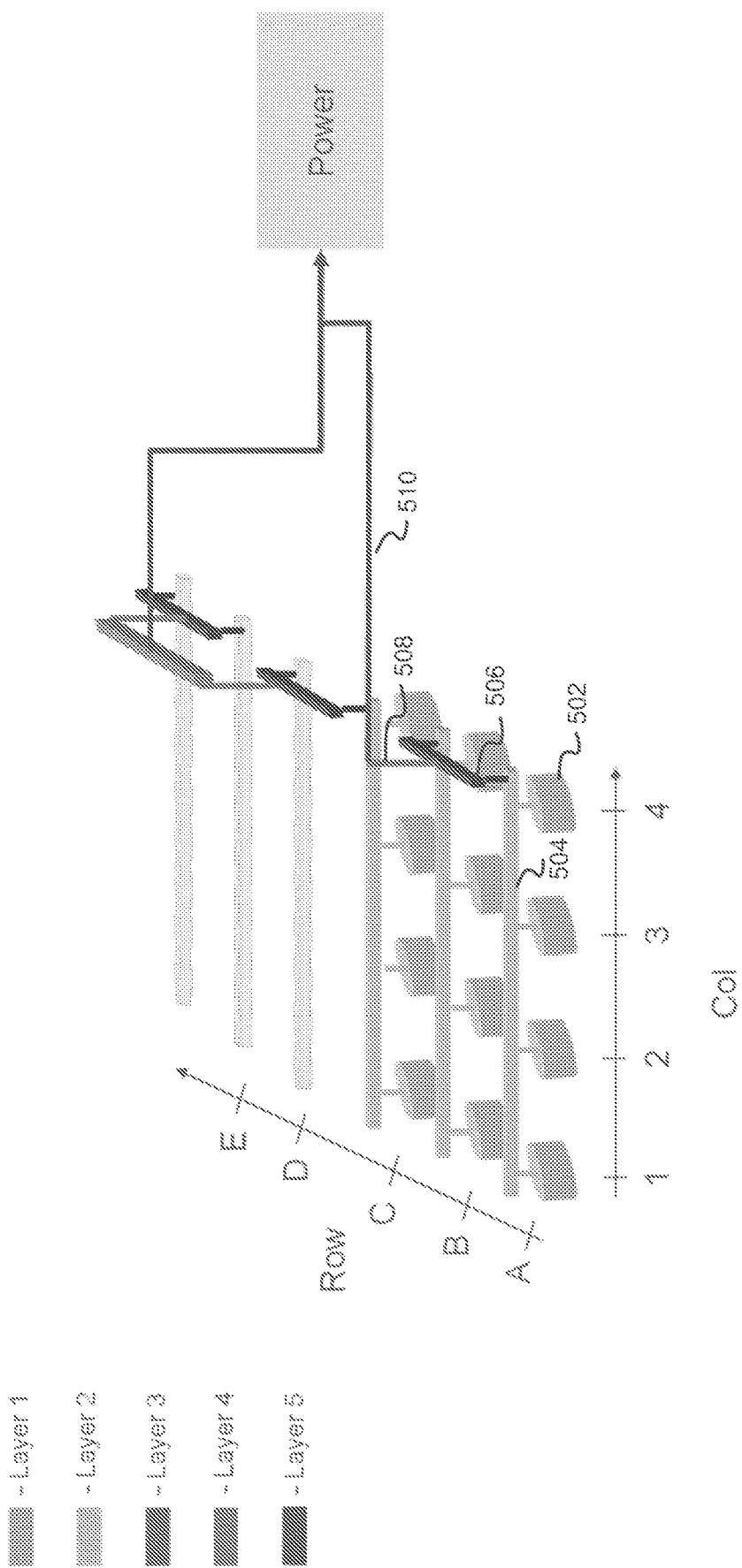
FIG. 5 illustrates a schematic illustration of an exemplary semiconductor specimen and an electrical test performed thereon in accordance with certain embodiments of the presently disclosed subject matter.

Referring now to FIG. 5, this depicts a schematic illustration of an exemplary semiconductor specimen and an electrical test performed thereon in accordance with certain embodiments of the presently disclosed subject matter.

The specimen as shown exemplifies part of a memory device and comprises five layers. The bottom layer 502, i.e., layer 1, comprises multiple structural features of memory cells, while upper layers 504, 506, 508 and 510 each comprises metal wires connecting lower layer features. It is to be noted that the separation of layers in FIG. 5 is simplified for illustrative and exemplary purposes. The figure should not be regarded as representing an actual memory device which can have additional and/or different layers. For instance, layer 504 can be regarded as comprising two sub-layers: an upper layer of metal wires, and an intermediate layer of contacts connecting the metal wires with the memory cells. Switches (not illustrated in the figure) may exist at various locations for controlling the electrical connections.

Electrical tests for the specimen can be performed in sequence (e.g., in a bottom-up approach) in order to test full functionality of the device and identify which part of the device is malfunctioning. By way of example, the electrical test may identify an electrical failure (e.g., an electrical short causing certain memory cells to have cross talk) at specific testing points. A malfunction layer and position can be located in the device according to the testing points. For instance, if an electrical short occurs between A1 to B1 only, the malfunction is probably related to layer 502 (e.g., a bridge between the two memory cells of A1 and B1). If the entire row A is shorted, the malfunction is probably related to layer 504. If the short is between row A and row C (not just between specific memory cells), the malfunction may relate to layer 506. If the entire device does not function properly, the malfunction probably relates to the layer 510, since this layer is the top layer that connects the device to the power supply. It is to be noted that the above exemplary scenarios are hypothetical examples for illustrative purposes only, which do not necessarily represent/correspond to real life device functionalities and defectivities.

Therefore, based on the electrical test data, it is possible to identify a suspected layer of the specimen that causes the functional defectivity. In addition, it is also possible to correlate the defectivity with respect to specific structural feature(s) at the suspected layer, e.g., based on the location of testing points where the electrical failure occurs. For instance, continuing with the above example, when an electrical short occurs between A1 to B1, it can be identified that layer 502 is the suspected layer that is causing the malfunction. More specifically, the cause of the malfunction is probably related to a bridge between the two memory cells of A1 and B1. When the electrical short occurs between row A and row C, it can be identified that layer 506 is the suspected layer that causes the malfunction, and the cause of the malfunction is probably related to the metal wire connecting the two rows. In some cases, the test data can be presented in the form of a test defectivity map informative of suspected locations of functional defectivity on a suspected layer of the specimen.

Since each layer is manufactured by a plurality of processing steps, among which at least some processing steps are inspected during in-line inspection, the inspection data can be retrieved and used to correlate with the test data in order to identify which processing step(s) may be the root cause of the malfunction.

Specifically, inspection data of the suspected layer acquired during inspection of the semiconductor specimen can be retrieved (204) (e.g., by the defectivity matching module 104 in the first PMC 102 via the I/O interface 126). The inspection data includes a set of inspection images corresponding to at least a sampled set of the plurality of processing steps of the structural features of the suspected layer, and a set of defect maps corresponding to the set of inspection images and indicative of inspection defectivity with respect to the sampled set of processing steps of the structural features.

As described above, the plurality of processing steps for manufacturing structural features in a layer can include, for example, one or more of the following: lithography, etching, filling, depositing, polishing, recessing, planarization, growth, and implantation, etc. The number of processing steps needed for manufacturing a feature depends on the complexity of the feature, which may range from a few steps to tens of steps. Continuing with the example of a contact of a storage node (such as a storage node contact (SNC) in a Dynamic random access memory (DRAM) device), it generally takes about four processing steps to manufacture it: lithography, etching, depositing, and polishing. Upon detection of a malfunction related to a SNC (e.g., a short occurring between 2 SNCs), the root cause of the malfunction may relate to any of the four processing steps for manufacturing the SNC.

During the in-line inspection of the layer of the SNCs, in some cases, all the processing steps can be sequentially inspected during the manufacturing process and an inspection image can be acquired following each of the four processing steps. In some other cases, the processing steps are sampled and only a subset of the processing steps are selected to be inspected during the inspection. The subset of selected processing steps is also referred to as the sampled set of processing steps. By way of example, it may be determined to only inspect the etching and polishing steps out of the four processing steps of manufacturing a SNC. In such cases, the sampled set includes the etching and polishing steps, and two inspection images are respectively acquired following the two processing steps.

The inspection images can be processed by a defect detection algorithm included in an inspection recipe. Defect detection algorithms can apply different detection methodologies for processing an inspection image and generating a defect map indicative of defect candidate distribution on the inspection image. By way of example, the defect detection algorithm can be a classic defect detection algorithm, such as a die-to-reference detection algorithm, e.g., Die-to-Die (D2D), Die-to-History (D2H), Die-to-Database (D2DB), etc. By way of another example, the defect detection algorithm can be based on a machine learning (ML) model. The generated defect map can be informative of a set of inspection defects (i.e., defect candidates) located on an inspection image. Each inspection defect can be associated with one or more defect attributes, such as, e.g., location, strength, size, and shape of the defect, etc.

In some embodiments, the inspection recipe can comprise a machine learning (ML) model configured for defect detection on inspection images. By way of example, an inspection image can be fed into the ML model for processing and the output of the ML model is a predicted defect map corresponding to the inspection image. The ML model can be previously trained (before deployment in runtime) using a training set. By way of example, a training set used for training a ML model in supervised learning normally includes one or more training samples, each including a respective training image and corresponding ground truth data associated therewith. Ground truth data can include label data of the training image which is indicative of whether there is presence of a defect of interest (DOI) or nuisance in the training image. Details of the ML model used herein and the training thereof will be described below in further detail.

Continuing with the description of FIG. 2, upon collection of both test data and inspection data, the test data can be correlated (206) (e.g., by the defectivity matching module 104 in the PMC 102) with the set of defect maps of the suspected layer, to identify one or more structural features of the suspected layer with unmatched defectivity between the functional defectivity indicated by the test data, and the inspection defectivity indicated by the set of defect maps.

For each structural feature of the identified one or more structural features, at least part of the set of inspection images of the structural feature can be included (208) (e.g., by a ML training module 106 in the PMC 102) in a training set. The training set can be used (e.g., by a ML training module 106 in the PMC 102) to train a machine learning model (e.g., the ML model 108) in an inspection recipe usable for inspection of a subsequent semiconductor specimen.

In some embodiments, the correlation between the test data and defect maps can be performed by aligning the test data with the set of defect maps and comparing the functional defectivity and the inspection defectivity for corresponding locations. By way of example, the test data (e.g., in the form of a test defectivity map) and the defect maps both correspond to the dimension of the inspected specimen (e.g., a die). The two types of data can be aligned by superimposing/overlaying one on the other using image registration techniques. The image registration as referred to herein can include measuring an offset between two image representations (e.g., the two types of maps) corresponding to the specimen, and shifting one relative to the other in order to correct the offset. The offset may be caused by various factors which occurred during the manufacturing and/or imaging processes. Registration can be implemented according to any suitable registration algorithms known in the art. By way of example, registration can be performed using one or more of the following algorithms: an area-based algorithm (e.g., Lucas-Kanade (LK) algorithm), feature based registration, or phase correlation registration.

Once the test data and the defect maps are aligned, the two types of defectivities of corresponding locations can be compared, and the locations (and the structural features thereof) with unmatched defectivity can be identified. There can be two types of unmatched defectivity: a first type of defects identified by the test data, but not by the defect maps, and a second type of defects identified by the defect maps, but not by the test data. As the test data provided by the test (such as an electrical test) represents the actual defectivity of the device functionality, it should be regarded as ground truth. For instance, the defects identified by the test data should be regarded as actual defects (i.e., DOIs) of the specimen, while the remaining parts of the specimen should be regarded as non-defective.

Therefore, the first type of defects as described above are actual defects that are somehow missed/not captured during the inspection process (i.e., hidden defects), and the second type of defects as described above are nuisances which are incorrectly detected as defects during the inspection process, but should actually be regarded as nuisances/non-defective. Such unmatched defect information can be used to optimize the inspection recipe, e.g., it can be used as training data to optimize the ML model in the inspection recipe, so that the ML model can learn the defect characteristics of the unmatched defects. The optimized ML model, when being used to inspect the next specimen in line, can provide improved detection performance. Examples of the two types of unmatched defectivity are detailed below with respect to FIGS. 3 and 4 in accordance with certain embodiments of the presently disclosed subject matter.

As illustrated in FIG. 3, according to certain embodiments, the one or more structural features as identified with unmatched defectivity (with reference to block 206) can include a first structural feature (302) indicated as defective by the test data, but not defective by the set of defect maps. As aforementioned, such a structural feature is actually defective. In such cases, the set of inspection images of the suspected layer can be analyzed (304) at the location of the first structural feature to identify one or more processing steps in the at least sampled set of processing steps which have high probability of causing defectivity of the first structural feature. Once identified, at least part of one or more inspection images of the one or more processing steps can be included (306) in the training set with an associated label of defect of interest (DOI). The at least part of the one or more inspection images corresponds to the first structural feature. For instance, the part can refer to an image portion extracted from each of the one or more inspection images at the location of the first structural feature. In some cases, the image portions as extracted from the one or more inspection images can be included in the training set with the associated label of DOI. In some other cases, the one or more inspection images (each in its entirety) can be included in the training set, with a label of DOI associated with the location of the first structural feature.

Additionally or alternatively, as illustrated in FIG. 4, in some embodiments, the one or more structural features as identified with unmatched defectivity (with reference to block 206) can include a second structural feature (402) indicated as defective by at least one defect map in the set of defect maps, but not defective by the test data. As aforementioned, such a structural feature is actually non-defective. In such cases, at least part of at least one inspection image corresponding to the at least one defect map can be included (404) in the training set with an associated label of nuisance. The at least part of the at least one inspection image corresponds to the second structural feature. Similarly as described above, the part can refer to an image portion extracted from the at least one inspection image at the location of the second structural feature. In some cases, the at least one image portion as extracted from the at least one inspection image can be included in the training set with the label of nuisance. In some other cases, the at least one inspection image (in its entirety) can be included in the training set, with a label of nuisance associated with the location of the second structural feature.

Figure 6:
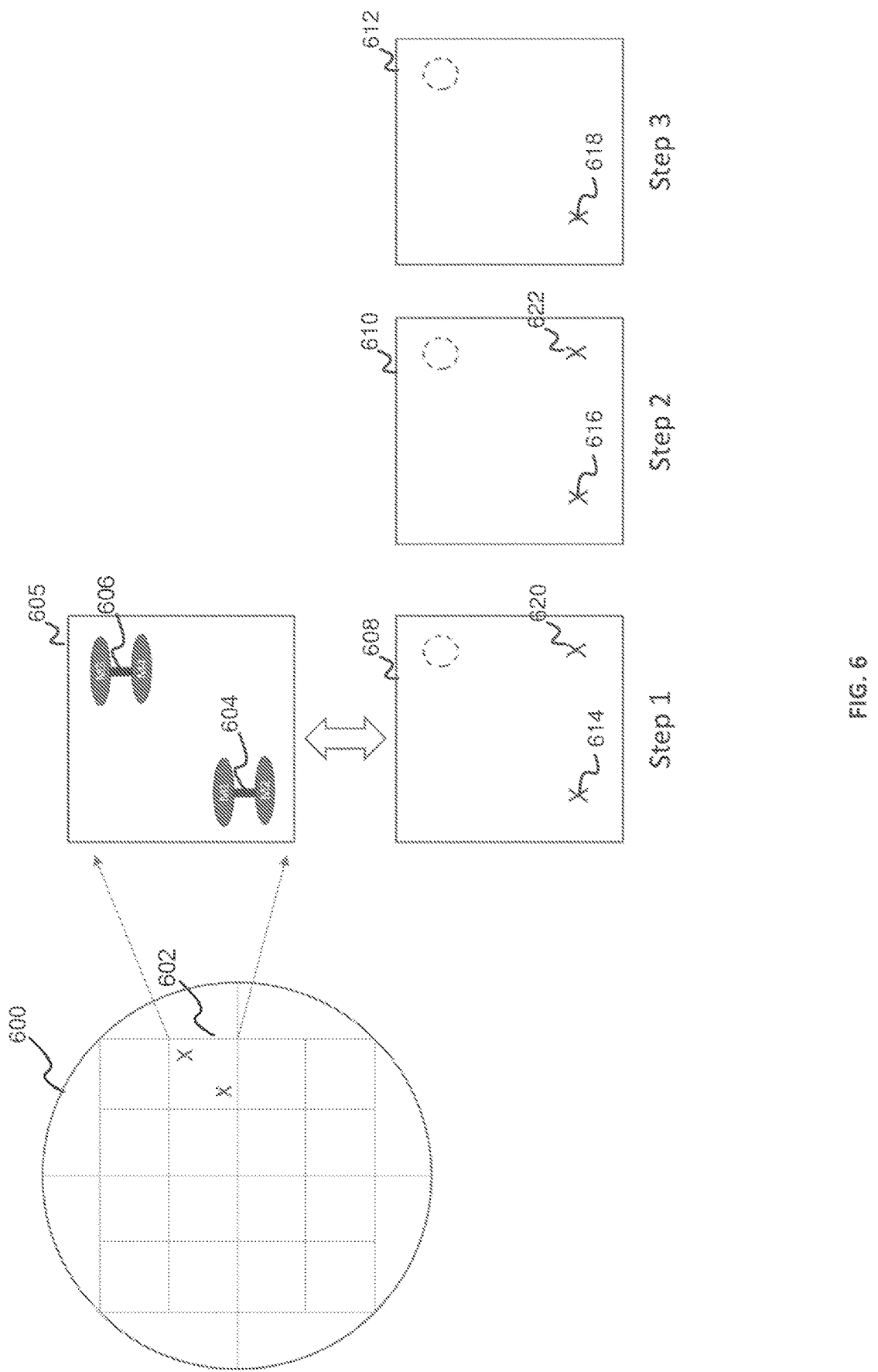
FIG. 6 schematically illustrates examples of unmatched defectivity between test data and defect maps in accordance with certain embodiments of the presently disclosed subject matter.

Turning now to FIG. 6, there are schematically illustrated examples of unmatched defectivity between test data and defect maps in accordance with certain embodiments of the presently disclosed subject matter.

A wafer 600 with multiple dies is illustrated. Assume each die is a memory device as exemplified in FIG. 5. After the fabrication process of the wafer, an EOL electrical test is performed on each die on the wafer, and a test defectivity map for each die is generated. Taking die 602 for example, two electrical malfunctions are identified through the test (marked with crosses on the die). Specifically, in accordance with the test data, two electrical shorts 604 and 606 are identified between two pairs of memory cells M1-M2, and M3-M4, as illustrated in test data 605. Continuing with the example of FIG. 5, the suspected layer of electrical shorts is identified to be layer 502.

When retrieving inspection data of layer 502, it is found that out of all the processing steps for manufacturing the memory cells in layer 502, three processing steps are sampled to be inspected: step 1, step 2, and step 3. Three defect maps 608, 610 and 612, corresponding to the three processing steps, are illustrated. As shown, at the locations 614, 616 and 618 of the three defect maps corresponding to the location of the electrical short 604 on the test data, an inspection defect is respectively identified. Therefore, the defectivity with respect to the structural feature M1 and/or M2 as indicated by the test data and by the defect maps, matches one with the other.

In comparison, no inspection defects are identified in any of the three processing steps at the locations (marked with dashed circles) corresponding to the location of the electrical short 606 on the test data, thereby illustrating an unmatched defectivity. Therefore, the electrical short 606 which indicates a true defect is somehow not captured during the inspection process. In such cases, the inspection images corresponding to the three processing steps are retrieved and analyzed at the location corresponding to the electrical short 606 in order to identify which processing step(s) thereof has high probability of causing the defectivity (i.e., electrical short). For instance, if the inspection images of step 1 and step 2 both show certain defective signals (e.g., detected with respect to certain reference signals, such as design data, and/or neighboring pixels in the same image or reference image(s), etc.) at the corresponding locations between M3 and M4, the two inspection images (or at least the image portions/patches extracted at the corresponding locations between M3 and M4) of step 1 and step 2 will be included in the training set with an associated label of (DOI) for the specific locations.

Despite of the above examples, it is to be noted that the standard of matching and/or unmatching can be broadly defined, and in some cases does not necessarily require the defect maps of all processing steps to exactly match or un-match with the test data. For instance, regarding the electrical short 604, it could be determined as matching defectivity if at least one defect map (or two defect maps) of all three defect maps identifies a corresponding inspection defect. In another example, regarding the electrical short 606, it could be determined as unmatched defectivity if the majority of defect maps does not capture a corresponding inspection defect, or if the defect map of a processing step that is most likely to cause such a type of electrical malfunction, fails to identify a corresponding inspection defect.

By way of example, two inspection defects 620 and 622 are identified at the defect maps 608 and 610, whereas at a corresponding location (related to at least one structural feature) in the test data 605, no electrical malfunction is identified. As aforementioned, it could be determined as un-matched defectivity, as two processing steps out of three do not match with the test data. In such cases, the inspection defects 620 and 622 are incorrectly detected as defects during the inspection process. The inspection images (or at least the image portions/patches extracted at the defect locations) corresponding to defect maps 608 and 610 will be included in the training set with an associated label of nuisance for the specific locations.

It is to be noted that, in some cases, the functional defectivity indicated by the test data with respect to at least one structural feature may be identified at a specific location or within a range of locations on the test defectivity map. For instance, the electrical short 604 is identified with respect to memory cells M1 and M2, and the suspected malfunction location should be within the range between M1 and M2. In another example, the malfunction in some cases may reside in a structural feature. In comparison, the inspection defectivity indicated by the defect map is normally identified at specific locations (e.g., with (x, y) coordinates). Thus, the functional defectivity as identified by the test data may in some cases correspond to multiple locations/pixels on the defect maps. Therefore, when correlating the two types of data, the matching of the defectivity between two corresponding locations should not be limited to two specific locations, but rather extend to a certain range/extent that may be relevant. The range/extent may be determined based on, e.g., the type of functional defectivity identified and the related structural features thereof.

It is to be noted that the at least part of one or more inspection images corresponding to the first structural feature should be broadly construed as the at least part capturing the first structural feature, or capturing a relevant range with respect to the first structural feature (e.g., a range between the first structural feature and a relevant structural feature). Similarly, the at least part of at least one inspection image corresponding to the second structural feature should be broadly construed as the at least part capturing the second structural feature, or capturing a relevant range with respect to the second structural feature (e.g., a range between the second structural feature and a relevant structural feature).

Referring back to FIG. 2, once a training set used to train the ML model in the inspection recipe is updated by including at least part of the set of inspection images of each structural feature as identified with unmatched defectivity, the training set can be used (e.g., by a ML training module 106 in the PMC 102) to train/re-train the ML model, which, upon being trained/re-trained, is usable for inspection of a subsequent semiconductor specimen.

As described above, the ML model in the inspection recipe used for inspecting the specimen, can be previously trained (before deployment in runtime) using a training set for detecting defects on inspection images. By way of example, a training set used for training a ML model in supervised learning normally includes one or more training samples, each including a respective training image and corresponding ground truth data associated therewith. Ground truth data can include label data of the training image which is indicative of whether there is presence of a defect of interest (DOI) or nuisance in the training image. A training image can be a "real world" image of a semiconductor specimen obtained by an inspection tool in a fabrication process thereof. Ground truth data can be obtained in various ways, such as, e.g., through the review process, by manual annotation, synthetic generation based on design data, machine learning based, or a combination of the above. For instance, the label data can be provided, e.g., in the form of bounding boxes of the DOIs or in the form of a binary image, in which only pixels belonging to DOIs get a value of "1" and non-defective pixels get a value of "0" etc. A cost function used during training of the ML can be based on detection accuracy/capture rate, and, optionally, also based on a penalty for misdetection and over-detections. The training set used to previously train the ML model can be enriched/updated by adding/including at least part of the set of inspection images of each structural feature as identified with unmatched defectivity, as described above.

It is to be noted that the ML model referred to herein can be implemented as various types/structures of machine learning models, such as, e.g., a decision tree, Support Vector Machine (SVM), Artificial Neural Network (ANN), regression model, Bayesian network, or ensembles/combinations thereof etc. The learning algorithm used by the ML model can be any of the following: supervised learning, unsupervised learning, or semi-supervised learning, etc. The presently disclosed subject matter is not limited to the specific type of ML model or the specific type or learning algorithm used by the ML model.

In some embodiments, the ML model can be implemented as a Deep neural network (DNN). DNN can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

In some embodiments, the weighting and/or threshold values of a DNN can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a deep neural network is referred to as a training set.

It is noted that the teachings of the presently disclosed subject matter are not bound by specific architecture of the ML or DNN as described above.

The ML model trained using the updated training set as described above can be capable of improving capture rate of DOIs which, were previously missed by the inspection recipe and reducing false alarm rate (FAR) of nuisances which, were previously incorrectly detected by the inspection recipe as DOIs.

In some embodiments, the ML model can be continuously re-trained and updated based on correlation of new test data and inspection data obtained for new production semiconductor specimens. By way of example, for a given production wafer comprising multiple dies, upon performing the test on each die and obtaining test data thereof, the test data of each die can be correlated with the corresponding inspection data as described above, and inspection images (or image portions/patches extracted therefrom) of structural features with unmatched defectivity can be added into the training set used to train the ML model, with associated labels of DOIs or nuisances. Optionally, certain defect attributes characterizing the inspection images or the defects thereof can be included in the training set as well. In some cases, design data of the processing steps (corresponding to the relevant structural feature) with high probability of causing the unmatched defectivity can be included, in addition to the at least part of inspection images, in the training set.

The updated training set can be used to re-train the ML model, giving rise to an updated ML model, which can replace the previous deployed ML model in the inspection recipe. The updated ML model can be used to inspect a subsequent semiconductor specimen in line. For instance, the test data and inspection data are obtained for the dies on a wafer N after the fabrication process thereof, and upon retraining of the ML model using inspection images of the dies of wafer N, the re-trained ML model can be used to inspect the next wafer in line which could be wafer N+m in the in-line inspection. The re-training process can be continuously repeated using updated training sets, thereby enabling to capture more DOIs while suppressing false alarms during the in-line inspection, thereby improving detection sensitivity thereof.

According to certain embodiments, the data correlation and training/re-training process as described above can be included as part of a process for optimizing/tuning an inspection recipe usable by system 101 for defect detection in runtime (where the ML model, once trained/re-trained, can serve as part of the inspection recipe). Therefore, the presently disclosed subject matter includes a system and method for optimizing/tuning an inspection recipe as described above.

It is to be noted that examples illustrated in the present disclosure, such as, e.g., the exemplified structures of the specimens, the processing steps of structural features, the exemplified defect maps and test data etc., are illustrated for exemplary purposes, and should not be regarded as limiting the present disclosure in any way. Other appropriate examples/implementations can be used in addition to, or in lieu of the above.

Among advantages of certain embodiments of the defect detection/recipe optimization system as described herein is an optimized inspection recipe with improved defect detection sensitivity, the inspection recipe including a ML model effectively trained using a training set generated by correlating test data and inspection data of a specimen and identifying unmatched defectivity therebetween. The ML model, upon being trained, is capable of detecting defects with improved capture rate of DOIs which were previously missed by the inspection recipe (i.e., hidden defects), and reduced false alarm rate (FAR) of nuisances which were previously incorrectly detected as DOIs.

Among further advantages of certain embodiments of the defect detection/recipe optimization system as described herein is that the ML model can be repetitively and continuously retrained and updated in production, upon new test data and inspection data becoming available, thereby enabling to optimize the ML model to be more robust to wafer/process variation based on up-to-date production wafer data, and thus being capable of improving capture rate and detection sensitivity for subsequent specimens in line.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system of optimizing an inspection recipe for inspecting a semiconductor specimen, the system comprising a processing and memory circuitry (PMC) configured to:
    obtain test data from a test performed on the semiconductor specimen after inspection thereof, the semiconductor specimen comprising one or more layers, each layer comprising structural features manufactured by a plurality of processing steps, the test data indicative of functional defectivity of the semiconductor specimen associated with at least one structural feature located on a suspected layer of the one or more layers;
    retrieve inspection data of the suspected layer acquired during the inspection of the semiconductor specimen, the inspection data including a set of inspection images corresponding to at least a sampled set of the plurality of processing steps of the structural features of the suspected layer, and a set of defect maps corresponding to the set of inspection images and indicative of inspection defectivity with respect to the sampled set of the plurality of processing steps;
    correlate the test data and the set of defect maps of the suspected layer to identify one or more structural features of the suspected layer with unmatched defectivity between the functional defectivity indicated by the test data and the inspection defectivity indicated by the set of defect maps;
    prepare a training set, wherein, for each structural feature of the identified one or more of the structural features, at least part of the set of inspection images corresponding to the structural feature and ground truth data thereof, as indicated by the test data, are included in the training set; and
    use the training set to train a machine learning (ML) model in the inspection recipe usable for inspection of a subsequent semiconductor specimen.

2. The computerized system according to claim 1, wherein the test is one of: an electrical test, a destructive test, or a reliability test.

3. The computerized system according to claim 1, wherein the inspection is in line inspection performed during a fabrication process of the semiconductor specimen, and the test is an end-of-line (EOL) test performed upon completion of the fabrication process or part thereof.

4. The computerized system according to claim 1, wherein structural features in a layer of the one or more layers are of a type of: a contact, a via, a gate, a shallow trench isolation (STI), or a metal wire.

5. The computerized system according to claim 1, wherein the plurality of processing steps includes one or more of the following: lithography, etching, filling, depositing, polishing, recessing, planarization, growth, or implantation, and the sampled set includes a subset of the plurality of processing steps that are selected to be inspected during the inspection.

6. The computerized system according to claim 1, wherein the correlation is performed by aligning the test data with the set of defect maps, and comparing the functional defectivity and the inspection defectivity for corresponding locations.

7. The computerized system according to claim 1, wherein the one or more structural features with unmatched defectivity include a first structural feature indicated as defective by the test data, but not defective by the set of defect maps, wherein the PMC is further configured to analyze the set of inspection images of the suspected layer at a location of the first structural feature to identify one or more processing steps in the at least sampled set with high probability of causing defectivity of the first structural feature, and wherein the including comprises including, in the training set, at least part of one or more inspection images of the one or more processing steps corresponding to the first structural feature with an associated label of defect of interest (DOI).

8. The computerized system according to claim 7, wherein the including further comprises including design data of the one or more processing steps corresponding to the first structural feature, in addition to the at least part of the one or more inspection images, in the training set.

9. The computerized system according to claim 1, wherein the one or more structural features with unmatched defectivity include a second structural feature indicated as defective by at least one defect map in the set of defect maps, but not defective by the test data, wherein the including comprises including, in the training set, at least part of at least one inspection image corresponding to the at least one defect map with an associated label of nuisance, the at least part corresponding to the second structure feature.

10. The computerized system according to claim 7, wherein the one or more structural features with unmatched defectivity further include a second structural feature indicated as defective by at least one defect map in the set of defect maps, but not defective by the test data, wherein the including comprises including, in the training set, at least part of at least one inspection image corresponding to the at least one defect map with an associated label of nuisance, the at least part corresponding to the second structure feature.

11. The computerized system according to claim 1, wherein the ML model, upon being trained, is capable of improving capture rate of defects of interest (DOIs) which were previously missed by the inspection recipe, and reducing false alarm rate of nuisances which were previously incorrectly detected by the inspection recipe as DOIs.

12. A computerized method of optimizing an inspection recipe for inspecting a semiconductor specimen, the method comprising:
    obtaining test data from a test performed on the semiconductor specimen after inspection thereof, the semiconductor specimen comprising one or more layers, each layer comprising structural features manufactured by a plurality of processing steps, the test data indicative of functional defectivity of the semiconductor specimen associated with at least one structural feature located on a suspected layer of the one or more layers;

retrieving inspection data of the suspected layer acquired during the inspection of the semiconductor specimen, the inspection data including a set of inspection images corresponding to at least a sampled set of the plurality of processing steps of the structural features of the suspected layer, and a set of defect maps corresponding to the set of inspection images and indicative of inspection defectivity with respect to the sampled set of the plurality of processing steps;

correlating the test data and the set of defect maps of the suspected layer to identify one or more structural features of the suspected layer with unmatched defectivity between the functional defectivity indicated by the test data and the inspection defectivity indicated by the set of defect maps;

preparing a training set, wherein, for each structural feature of the identified one or more of the structural features, at least part of the set of inspection images corresponding to the structural feature, and ground truth data thereof, as indicated by the test data, are included in the training set; and using the training set to train a machine learning (ML) model in the inspection recipe usable for inspection of a subsequent semiconductor specimen.

13. The computerized method according to claim 12, wherein the inspection is in-line inspection performed during a fabrication process of the semiconductor specimen, and the test is an end-of-line (EOL) test performed upon completion of the fabrication process or part thereof.

14. The computerized method according to claim 12, wherein the correlation is performed by aligning the test data with the set of defect maps and comparing the functional defectivity and the inspection defectivity for corresponding locations.

15. The computerized method according to claim 12, wherein the one or more structural features with unmatched defectivity include a first structural feature indicated as defective by the test data, but not defective by the set of defect maps, wherein the method further comprises analyzing the set of inspection images of the suspected layer at a location of the first structural feature to identify one or more processing steps in the at least sampled set with high probability of causing defectivity of the first structural feature, and wherein the including comprises including, in the training set, at least part of one or more inspection images of the one or more processing steps corresponding to the first structural feature with an associated label of defect of interest (DOI).

16. The computerized method according to claim 15, wherein the including further comprises including design data of the one or more processing steps corresponding to the first structural feature, in addition to the at least part of the one or more inspection images, in the training set.

17. The computerized method according to claim 12, wherein the one or more structural features with unmatched defectivity include a second structural feature indicated as defective by at least one defect map in the set of defect maps, but not defective by the test data, wherein the including comprises including, in the training set, at least part of at least one inspection image corresponding to the at least one defect map with an associated label of nuisance, the at least part corresponding to the second structure feature.

18. The computerized method according to claim 15, wherein the one or more structural features with unmatched defectivity include a second structural feature indicated as defective by at least one defect map in the set of defect maps, but not defective by the test data, wherein the including comprises including, in the training set, at least part of at least one inspection image corresponding to the at least one defect map with an associated label of nuisance, the at least part corresponding to the second structure feature.

19. The computerized method according to claim 12, wherein the ML model, upon being trained, is capable of improving capture rate of defects of interest (DOIs) which were previously missed by the inspection recipe, and reducing false alarm rate of nuisances which were previously incorrectly detected by the inspection recipe as DOIs.

20. A non-transitory computer readable storage medium tangibly embodying a program of instructions that, when executed by a computer, cause the computer to perform a method of optimizing an inspection recipe for inspecting a semiconductor specimen, the method comprising:

obtaining test data from a test performed on the semiconductor specimen after inspection thereof, the semiconductor specimen comprising one or more layers, each layer comprising structural features manufactured by a plurality of processing steps, the test data indicative of functional defectivity of the semiconductor specimen associated with at least one structural feature located on a suspected layer of the one or more layers;

retrieving inspection data of the suspected layer acquired during the inspection of the semiconductor specimen, the inspection data including a set of inspection images corresponding to at least a sampled set of the plurality of processing steps of the structural features of the suspected layer, and a set of defect maps corresponding to the set of inspection images and indicative of inspection defectivity with respect to the sampled set of the plurality of processing steps;

correlating the test data and the set of defect maps of the suspected layer to identify one or more of the structural features of the suspected layer with unmatched defectivity between the functional defectivity indicated by the test data and the inspection defectivity indicated by the set of defect maps;

preparing a training set, wherein, for each structural feature of the identified one or more structural features, at least part of the set of inspection images corresponding to the structural feature, and ground truth data thereof, as indicated by the test data, are included in the training set; and using the training set to train a machine learning (ML) model in the inspection recipe usable for inspection of a subsequent semiconductor specimen.

* * * * *